United States Patent [19]

Wellington et al.

[11] 4,265,514
[45] May 5, 1981

[54] GUIDE CAPSULE FOR OPTICAL FIBER CONNECTORS

[75] Inventors: Charles K. Wellington, Tyngsboro; Mark L. Dakss, Sudbury, both of Mass.; John E. Benasutti, Oil City, Pa.

[73] Assignees: GTE Laboratories, Waltham, Mass.; Sylvania Inc., Stamford, Conn.

[21] Appl. No.: 49,691

[22] Filed: Jun. 18, 1979

[51] Int. Cl.$^3$ .............................................. G02B 5/14
[52] U.S. Cl. .............................. 350/96.21; 350/96.22
[58] Field of Search .......................... 350/96.22, 96.21

[56] References Cited

U.S. PATENT DOCUMENTS

| 3,798,099 | 3/1974 | Marcatili | 350/96.21 |
|---|---|---|---|
| 3,861,781 | 1/1975 | Hasegawa et al. | 350/96.21 |
| 4,043,026 | 8/1977 | Weidhaas et al. | |
| 4,043,854 | 8/1977 | LeNoane et al. | |
| 4,046,453 | 9/1977 | Fiebelkorn et al. | |
| 4,046,454 | 9/1977 | Pugh | |
| 4,049,414 | 9/1977 | Smith | |
| 4,102,561 | 7/1978 | Hawk et al. | 350/96.21 |
| 4,123,137 | 10/1978 | Marcatili | 350/96.22 |

OTHER PUBLICATIONS

Optical Waveguide Cable Connection by Thiel & Hawk, Applied Optics vol. 15, No. 11, Nov. 1976, pp. 2785-2791.
"A Fiber Optic Cable Connector" by C. M. Miller, The Bell System Technical Journal, vol. 51, No. 9, Nov. 1975, pp. 1547-1555.
"A Molded-Plastic-Cables" by Smith et al., The Bell System Tech. Journal vol. 54, No. 6, Aug. 1975, pp. 971-984.
An Injection-Cable by Cherin et al., The Bell System Tech. Journal vol. 55, No. 8, Oct. 1976, pp. 1057-1067.
"Multipole Optical Fibre Connector" by Guttman et al., Electronics Letters, Nov. 27/75, vol. 11, No. 24, pp. 582-583.
"Eccentric Coupler for Optical Fibers-" by Zemon et al., Applied Optics vol. 14, Apr. 1975, pp. 815, 816.
"Plug In-Coupler" by M. L. Dakss et al., Electronic Letters, Jul. 11/74, vol. 10, No. 14, pp. 280, 281.
"Preperation of-Splices" by Chinnock et al., Bell System Tech. Journal vol. 54, Mar. 1975, pp. 471-477.
"Optical Fibre Connector" by Dalgleish et al., Electronic Letter, Jan. 9, 1975, vol. 11, No. 1, pp. 24-26.
"Optical Communication" Marketing Dept., Bell-Northers Research-BNR C-10 product.
Connecting the Thread of Light" by K. J. Fenton et al., Proc. Electrical Connector Symposium Cherry Hill, NJ., 1976, pp. 64-72.
Electrical Communicator, vol. 51, No. 2, 1976, pp. 85-90.
"Preparation of Optical Fiber End-" by Chinnock et al., Bell System Tech. Journal, Mar. 1975, vol. 54, No. 3, pp. 471-476.

*Primary Examiner*—Harold A. Dixon
*Attorney, Agent, or Firm*—Fred Fisher

[57] ABSTRACT

Each of a pair of members has a mating surface extending from one edge to another. When they are mated together, with optical fibers, they act as a housing. At least one member includes formed grooves on its mating surface, extending from one edge to another thereof. Each groove from one edge of the mating surface to a point medial to the one edge and the other edge is formed to at least partially hold an unjacketed optical fiber therein. Each groove from such point to the other edge is formed to at least partially hold a jacketed optical fiber therein. Each groove in at least one of the members can be uniformly formed from the one edge of the mating surface to the respective point, and can be uniformly formed from the respective point to the other edge of the mating surface. Each groove can change from one uniform formation to a different uniform formation at the respective point. The mating surfaces, preferably, are predominately planar, and the respective points of the fibers are oriented along a reference locus. Desirably, the housing, with the optical fibers, has jacketed fibers extending from one edge, and unjacketed fibers extending from the other edge. When the first edge is planar, the unjacketed fibers can extend therefrom to a common plane parallel to the first edge.

7 Claims, 20 Drawing Figures

GUIDE CAPSULE FOR OPTICAL FIBER CONNECTORS

BACKGROUND OF THE INVENTION

1. Field of the Invention

This invention relates to means for making repeatable connections on optical fiber cables, and, in particular, to guide capsules for optical fiber connectors. Accordingly, it is a general object of this invention to provide new and improved devices of such character.

2. Description of the Prior Art

Several connectors for optical fibers have been proposed in the prior art, and some of these have been demonstrated to give losses in the 0.5–2 dB range.

The prior art connectors generally suffer from one or more of the following disadvantages:

(a) There is no simple, breakage-free way to rearrange the optical fibers from their positions in a circular array at the end of a cable to their positioning in the usually linear array in alignment channels.

(b) There is no assurance of coplanarity of the fiber end faces.

(c) The separation between mating fiber ends is uncontrollable.

(d) The optical fibers must be encapsulated in ribbons within the cable for proper orientation in the connector, whereas many cables are not made in this fashion, e.g., the circular array of optical fibers in an available commercial cable.

(e) A time-consuming field step of grinding and polishing is required for connector end preparation.

(f) The connector halves are for single fibers, though they can be ganged to connect a limited amount of fibers in a multi-fiber cable.

(g) A precision fixture is used to control the longitudinal positioning of each fiber, and thus the spacing between the ends of mating fibers, thus being time-consuming and unwieldy when more than one fiber is involved in a cable.

(h) Difficulties in getting fibers to lay down at the bottom of V-grooves.

(i) The connector is not suitable for reuse.

(j) The connector is not suitable for more than a few rematings.

(k) The connectors require that a fiber jacket be coated on, and in intimate contact with, the fiber, and be accurately controlled in circularity and thickness, in order to assist the insertion of the fiber into the connector.

SUMMARY OF THE INVENTION

Another object of this invention is to provide new and improved housings for supporting a plurality of partially jacketed optical fibers.

Yet another object of this invention is to provide new and improved means for maintaining a plurality of fibers having ends located in a common plane.

A further object of this invention is to provide new and improved means for connecting optical fibers which provide low loss and damage-free connections.

In accordance with one embodiment of the invention, the housing includes a pair of matable members, each having a mating surface extending from a first edge to a second edge. When the mating surfaces are mated together, with a plurality of optical fibers, the members act as the housing. At least one of the members includes a like plurality of formed grooves located on a mating surface thereof, extending from the first edge of the mating surface to the second edge of the mating surface. Each of the formed grooves from the first edge of the mating surface to a respective point between the two edges has a cross-section of a first configuration and is formed to at least partially hold an unjacketed optical fiber therein. Each of the formed grooves from the respective point to the second edge has a cross-section of a second configuration and is formed to at least partially hold a jacketed optical fiber therein. The second configuration cross-section is larger than the first configuration cross-section. In accordance with certain features of the invention, each of the grooves in at least one of the members is uniformly formed from the first edge of the mating surface to the respective point, and is uniformly formed from the respective point to the second edge of the mating surface. In accordance with another feature, each of the grooves changes from one uniform formation to a different uniform formation at the respective point.

In accordance with another embodiment of the invention, a housing supports a plurality of optical fibers, with each of the fibers being essentially jacketed with its jacket removed from one of its respective ends to a point spaced therefrom. The housing includes a pair of matable members, each having a mating surface extending from a first edge to a second edge. When the mating surfaces are mated together, with the optical fibers, the housing is formed. At least one of the members has a like plurality of first grooves extending from the first edge to a reference locus along its mating surface, and has a like plurality of second grooves extending from the reference locus to the second edge along the mating surface. The reference locus lies between the first edge and the second edge. The first grooves are adapted to support, at least partially, unjacketed optical fiber portions. The second grooves are adapted to support, at least partially, jacketed optical fiber portions. In accordance with certain features of the invention, the mating surfaces are predominately planar, and the points of the fibers are oriented along the reference locus. Further, the housing, with the plurality of optical fibers, has jacketed fibers extending from the second edge, and unjacketed fibers extending from the first edge. Still further, with certain features, the first edge is planar, and the unjacketed fibers extend therefrom to a common plane parallel to the first edge.

BRIEF DESCRIPTION OF THE DRAWING

Other objects, advantages, and features of this invention, together with its construction and mode of operation, will become more apparent from the following description, when read in conjunction with the accompanying drawing, in which.

DESCRIPTION OF THE INVENTION

This invention discloses the use of a capsule or housing 10 for the holding fibers 11—11 and jackets 12—12 so as to mount the partially jacketed, partially unjacketed fibers 13—13 prior to their end preparation, and prior to their insertion into the body of an optical connector. The use of such a capsule is applicable in the connector described in U.S. Pat. No. 4,146,299, as well as in other connectors.

Figure 1:
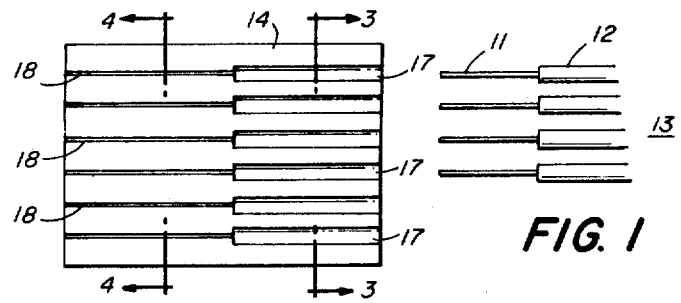
Figure 2:
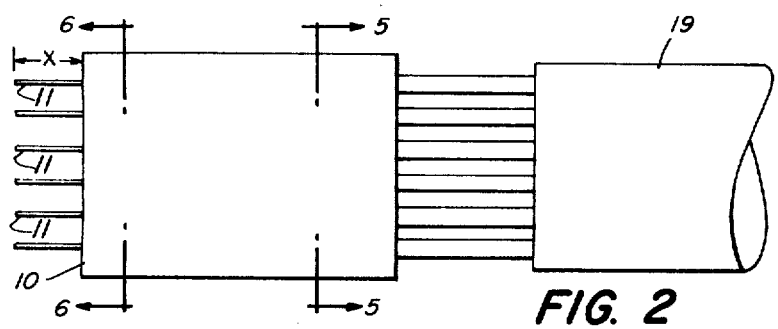

One embodiment of the capsule housing 10 is illustrated in FIGS. 1 and 2. FIG. 1 shows a capsule "half", or one of two members 14, 16 which form the housing 10. Large grooves 17—17 accept and hold the jackets 12—12, and the smaller grooves 18—18 hold the bare fibers 11—11. Each fiber 13 has its jacket 12 stripped back an appropriate amount before being placed in the capsule housing 10.

FIG. 2 illustrates a multiple fiber cable 19, stripped back, with the completed capsule housing 10 holding the fibers 11—11 in their proper orientation, that is, so that their axes are parallel and coplanar, but spaced apart by fixed distances.

Figures 1A, 1B:
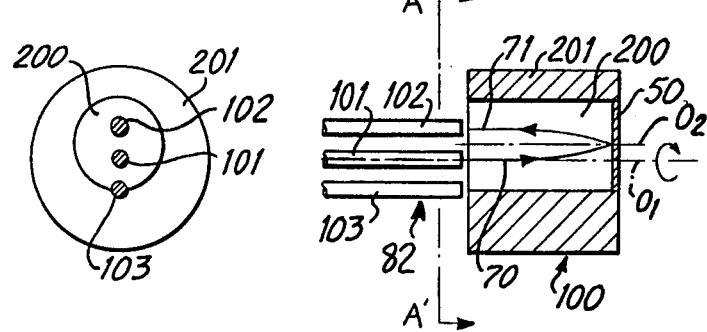
FIG. 1 is a plan view of one of two matable members for forming a capsule housing for supporting a plurality of partially jacketed optical fibers, in accordance with a preferred embodiment of the invention, some of said fibers being illustrated.
Figure 2A:
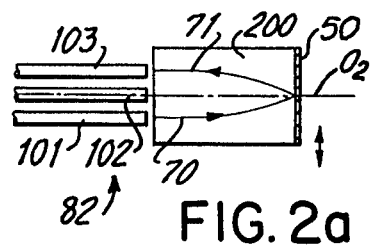
FIG. 2 is a plan view of a completed capsule housing, together with a multiple fiber cable, in accordance with an embodiment of the invention.
Figure 2B:
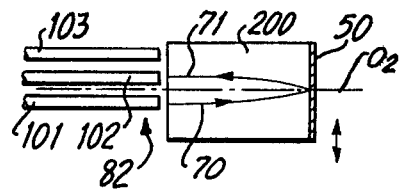
Figure 3B:
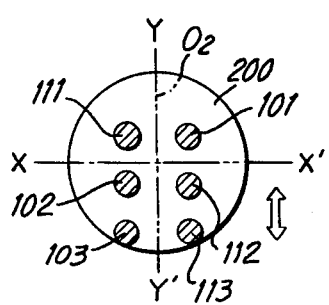
FIG. 3 is a sectional view of a first embodiment taken along the line 3—3 of FIG. 1.
FIG. 3a is a sectional view of a second embodiment taken along the line 3—3 of FIG. 1.
Figure 3A:
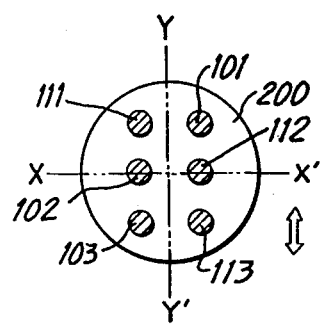
Figure 4A:
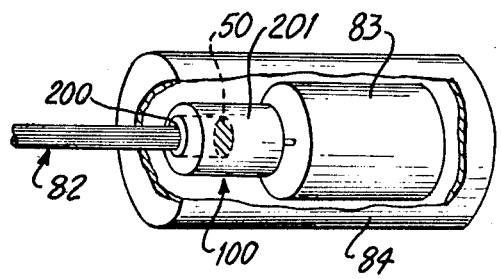
FIG. 4a is a sectional view of said second embodiment, taken along the line 4—4 of FIG. 1.
Figure 4B:
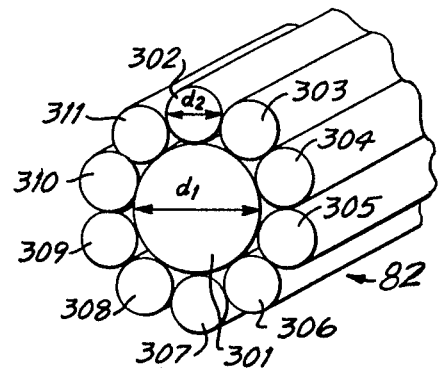
FIG. 4 is a sectional view of said first embodiment, taken along the line 4—4 of FIG. 1.
Figure 4C:
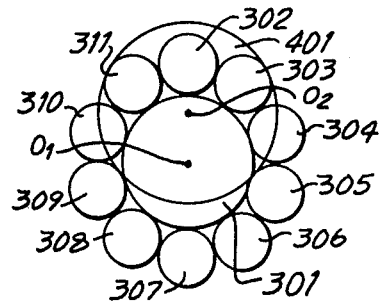
Figure 4D:
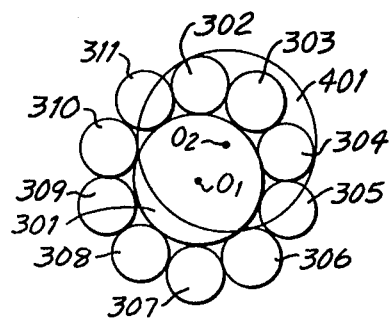
Figure 3:
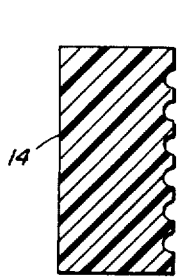
Figure 4:
Figures 3A, 4A:
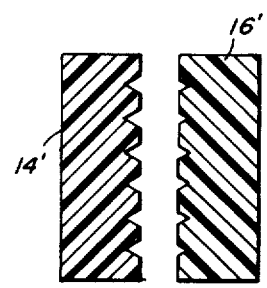
Figure 7:
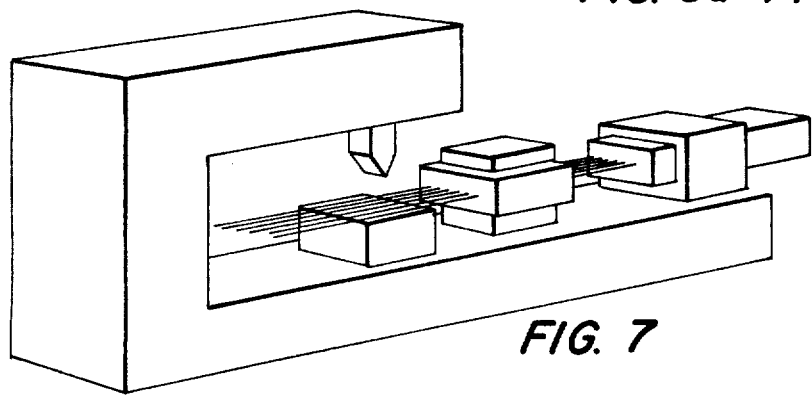

The capsule member 14 can have semicircular grooves, as shown in FIGS. 1 and 3. They can have V-shaped grooves as shown by member 14' in FIG. 3a. They can be recessed semicircular grooves as does member 14b shown in FIG. 5b.

Figure 5A:
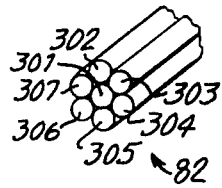
FIGS. 5a, 5b, 5c, and 5d are sectional views of different embodiments of the invention taken along the line 5—5 of FIG. 2.
Figure 5B:
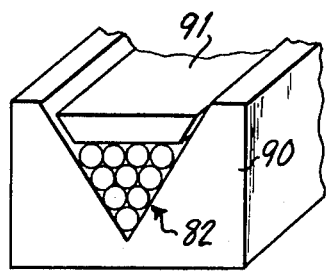
Figure 5C:
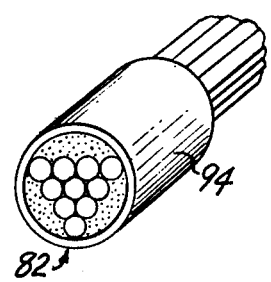
Figure 6:
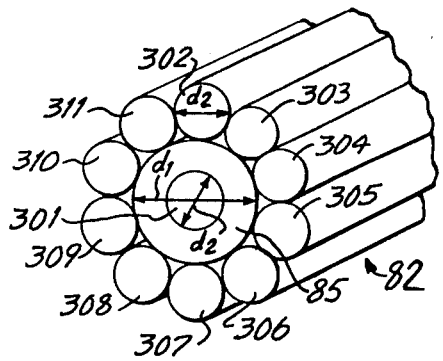
FIGS. 6a and 6b are sectional views of different embodiments of the invention, taken along the line 6—6 of FIG. 2.
Figure 5A:
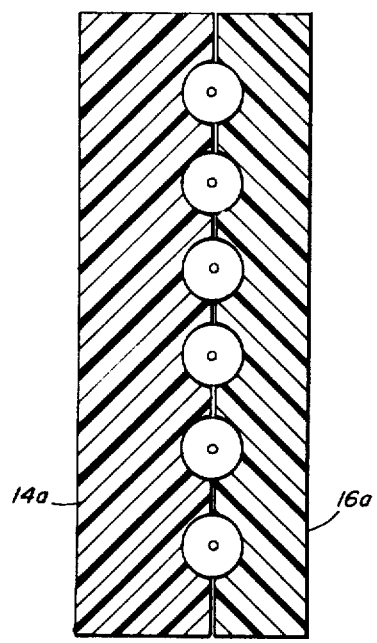
Figure 5B:
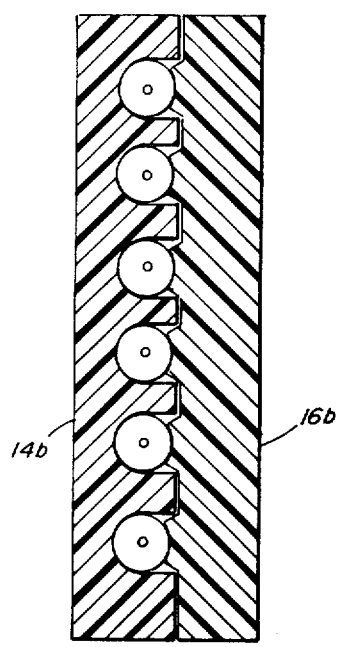
Figure 5C:
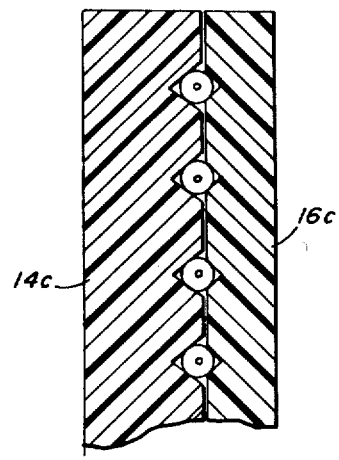
Figure 5D:
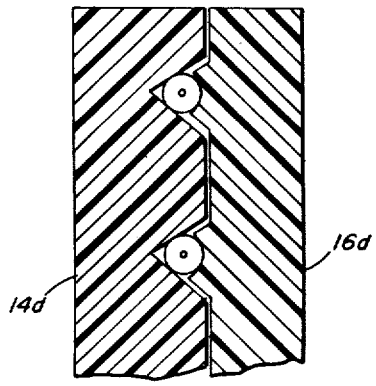

The capsule member 16 is designed to mate with the capsule member 14, and can have similar shaped grooves as shown in FIG. 5a; it can have partially projecting arcuate fingers as shown in FIGS. 5b and 5d; it can have V-shaped grooves as does the member 16c in FIG. 5c.

The capsule halves 14, 16 are fastened together, as by adhesive, ultrasonic welding, or heat staking. The design can be such that the fibers 11—11 and/or the jackets 12—12 are held tightly in the capsule housing 10. Preferably, the capsule housing 10 is formed of injection molded plastic parts, although other materials can be used. The combination of injection molded plastic parts, plus the foregoing fastening techniques, yields an inexpensive but accurate fiber-holding capsule housing.

Figure 7:
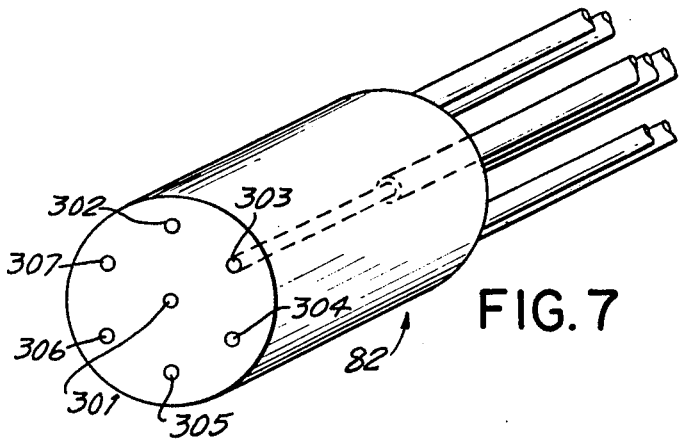
FIG. 7 is a schematic view of a multiple-fiber cable, a housing in accordance with this invention, and a multiple-fiber cleaver.

When the fiber ends are cleaved by a score and break technique at a controlled longitudinal distance "X" from a reference surface such as the front surface of the capsule housing, as shown in FIG. 2, the fibers 11—11 are then completely positioned and oriented in an optical fiber connector (not shown) that properly contains the capsule housing. As shown schematically in FIG. 7, the fibers 11—11 can be cleaved in a multiple-fiber cleaver 21, such as that described by E. L. Chinnock et al., *Bell Syst. Technical Journal*, 54, 471 (1975), supra. With such a device, more than one fiber can be readily cleaved, in a manner which controls the longitudinal distance X with high precision for each fiber. Thus, when such a capsulized group of fibers mate with a second group of fibers in an appropriately designed connector, the separation of the ends, or their end pressure, is controlled to minimize connector losses and to minimize end chipping.

The capsule housing 10 can be housed within an optical connector, such as that described in U.S. Pat. No. 4,146,299, supra, or with a variety of other connectors. Various advantages accrue: The use of the capsule housing facilitates the handling of multiple fibers during a cable connection. The capsule housing aids in guiding the bared fibers accurately into the appropriate channels of an optical connector. The capsule housing controls the longitudinal cleaving dimension "X" for subsequent control of the fiber end spacing or joint pressure (sometimes termed "end loading").

To control the final positioning of the fiber ends in a connector, the capsule housing is registered against a stop within the connector housing. During cable end preparation, the capsule housing can be installed, if desired, in the end-housing of a connector that also clamps and holds the cable jacket. Optionally, the end housing can extend over the capsule housing to protect fibers on the front (i.e., "X") end of the capsule housing.

Figure 8:
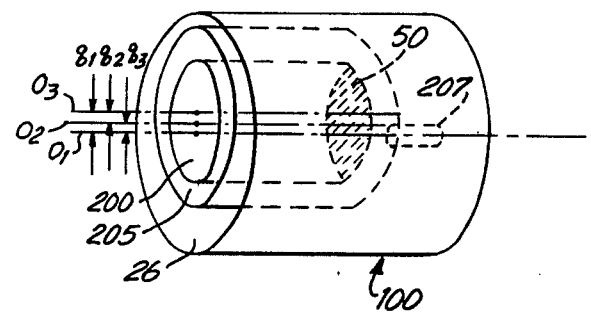
FIGS. 8a and 8b are plan and end views, respectively, illustrating a method for controlling the length of optical fibers.

The following methods can be employed for accurately controlling the dimension "X":

Referring to FIGS. 8a and 8b, the capsule housing 801 holds the fibers 802—802 which are provided from a cable 803. The fibers 802—802 are held in the housing 801 in the same manner as described above in connection with FIGS. 1-7. That is, the housing 801 contains large grooves for holding fibers at their jacketed portions, and small grooves for holding fibers at their bared portions.

By rotating an end cap 804, which engages with a fine thread 806 about the capsule end, a face plate 807 aids in adjusting the length "X" of the bared fibers 808—808 which protrude through apertures in the face plate 807.

The measurement of the length "X" can be assisted with the help of a low-power microscope having a reticle scale.

Figure 9:
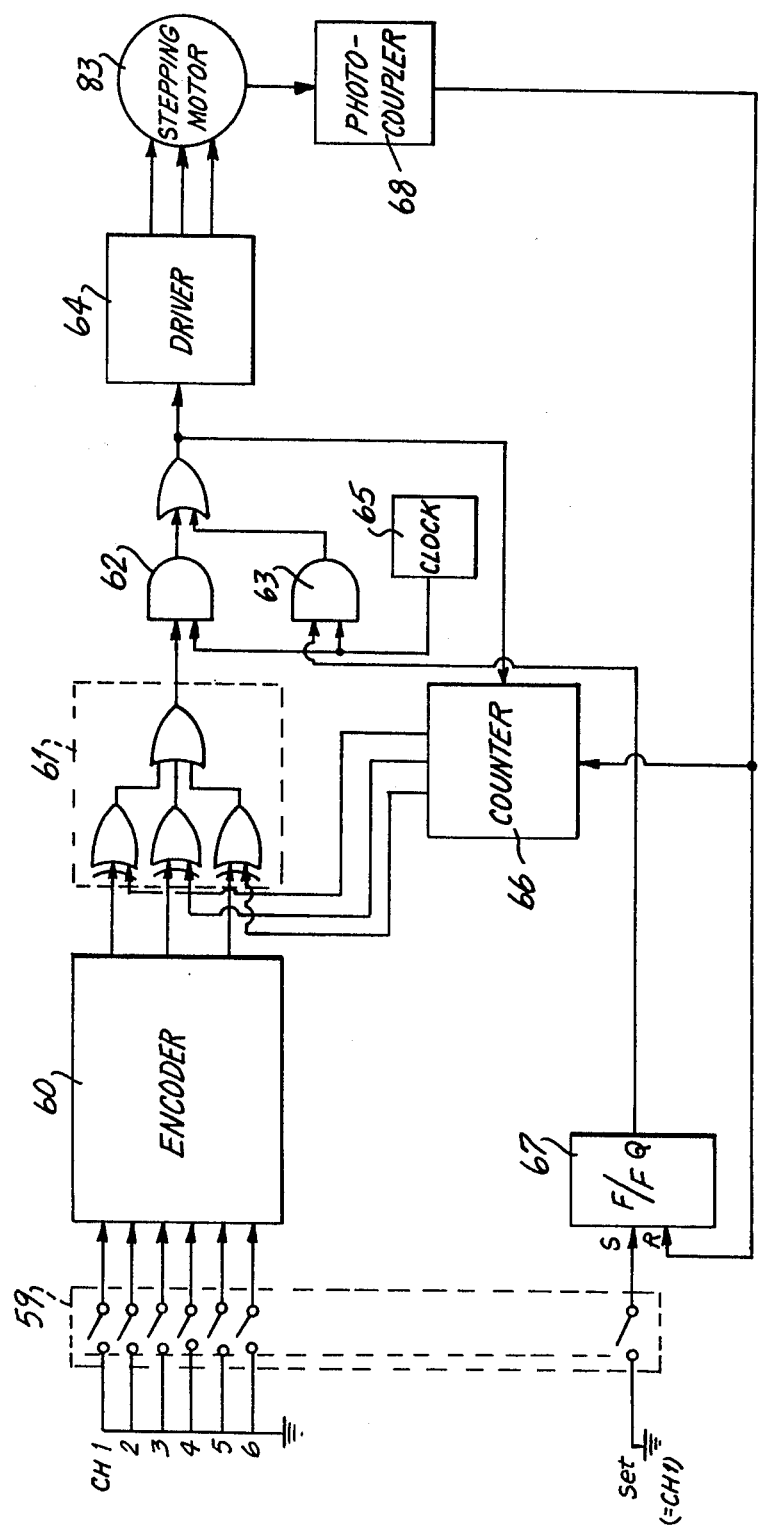
FIGS. 9a and 9b are plan and end views respectively, illustrating another method for controlling the length of optical fibers.
Figure 10:
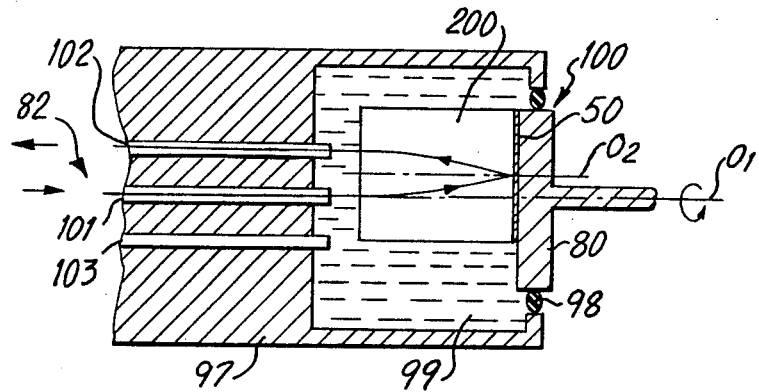
FIG. 10a illustrates another method for controlling the length of optical fibers in which a capsule housing is about to be inserted into a gauging mechanism.
FIG. 10b showing the housing inserted thereinto.

In an alternate technique, referring to FIGS. 9a and 9b, the capsule housing 901 holds the fibers 902—902 which are provided from a cable 903. Similarly, the fibers are held in the housing 901 in the same manner as above. A guide block 904, shown in dotted outline, has an axial length "X" and has tapered guide holes 906—906 for receiving the fibers 907. The fibers 907, preferably, are potted into the guide block 904, and protrude from the block 904 by a small amount. Holding the block 904 and capsule housing 901 together, one can polish down the ends of the fibers 907, as with a reciprocating abrasive member 908, until they are flush with the ends of the block 904. Thus, all fiber lengths are accurately controlled by the tolerances on the guide block 904. The fibers are subsequently removed from the guide block.

Figure 10A:
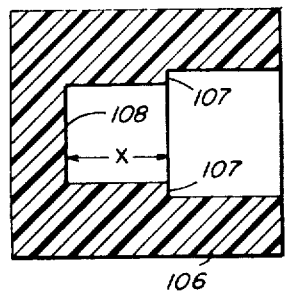
Figure 10A:
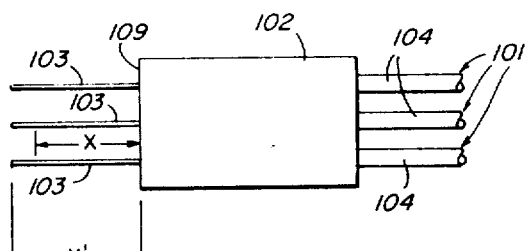
Figure 10B:
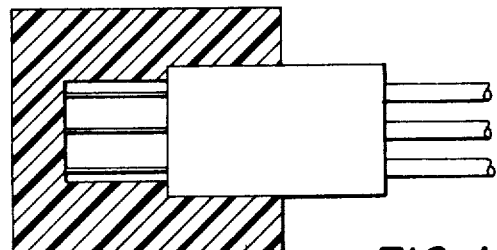
Figure 11:
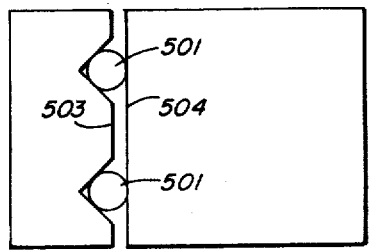

Another method, which does not require polishing or the use of an optical viewing system, is depicted in FIGS. 10a and 10b. In this technique, the fibers 101—101 are inserted into the capsule housing 102 with the top mating member closed onto the lower mating member, but not so tightly as to hinder the longitudinal movement of the fibers 103—103 and jackets 104—104 within. The fibers 103—103 are cleaved while located in the capsule housing 102 in such a way that they protrude therefrom by a distance X' (FIG. 7a), which distance need not be precise, but is nonetheless greater than the final desired distance X. The capsule housing 102 is then inserted gently into a gauging mechanism 106 as shown in FIG. 10b which has two reference surfaces 107,108 which are spaced by the desired distance X. The fibers 103 are then pushed in gradually until the reference surface 107 hits the front surface 109 of the capsule housing 102. The capsule 102 is then closed, with adhesive or other techniques discussed above, gripping the fibers 103—103 and jackets 104—104. The fibers 103—103 then protrude by the required distance X. Experience has indicated that the fiber pushing operation can be performed without damaging the fiber ends.

Figure 11:
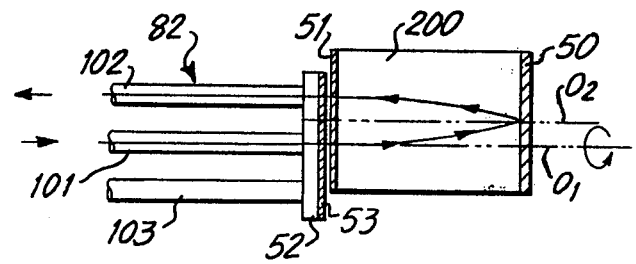
FIG. 11 is a sectional view of yet another embodiment of the invention taken along the line 3—3 of FIG. 1 (and is, also, a magnified view taken along the line 4—4 of FIG. 1).
Figure 12:
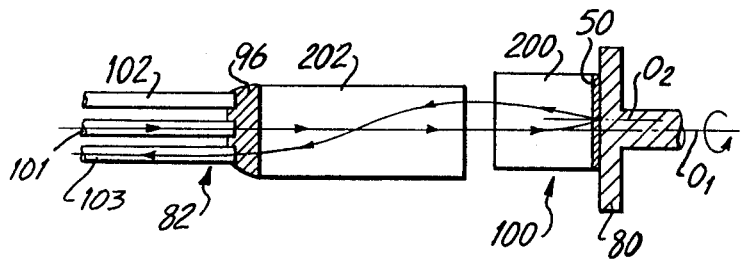

A preferred mode of practicing the invention is depicted in FIG. 11 in which the optical fibers 501—501 are arranged so that each contact the housing 502 at only three points. This can be conveniently achieved with one half 503 of the housing having V-shaped grooves, while the other half 504 of the housing is planar.

In conclusion, the purpose of the capsule housing is to house and hold a plurality of jacketed optical fibers in such a manner that jacketed fibers enter the housing and bared fibers exit the housing. After the fibers are housed, the fiber ends are treated, as by cleaving, polishing, or gauging, so that the ends are coaligned along a plane parallel to the end of the capsule. Preferably, the bare fibers are arranged in a coplanar array so that they can be easily inserted into a like array of optical connectors. A planar array is desirable because of high accuracy achievable with etching techniques. A semicircular configuration is acceptable, but not as accurate as a planar configuration. The capsule housing finds exceptional utility in converting fibers in a circular array to a linear array.

Through the practice of this invention, various advantages accrue:

1. Ease of insertion of fibers into optical connectors.
2. Facilitates handling of fibers, with minimal occurrence of fiber damage.
3. Simplifies positioning into housing without necessity for complex tapers.
4. Accurate control over end separation, or end pressure, of the mating fibers.
5. Facilitates multiple cleaving of fibers.
6. Versatile usage with a variety of connectors.
7. Inexpensive.
8. Suitable for usage with large number of fibers.

Various modifications will suggest themselves to those skilled in the art, without departing from the spirit and scope of the appended claims. For example, the capsule housing can be formed from material other than plastic, such as zinc or aluminum.

What is claimed is:

1. A housing for supporting a plurality of partially jacketed optical fibers, wherein jacketed optical fibers have larger cross-sections than the corresponding optical fibers without jackets, comprising
   a pair of matable members, each having a mating surface extending from a first edge to a second edge, which, when their mating surfaces are mated together, with said plurality of optical fibers, acts as said housing,
   at least one of said members comprising
      a like plurality of formed grooves located on a mating surface thereof extending from said first edge of such mating surface to said second edge of such mating surface,
      each of said formed grooves from said first edge of such mating surface to a respective point between the two edges of such mating surface having a cross-section of a first configuration and being formed to at least partially hold on unjacketed optical fiber therein, and each of said formed grooves from said respective point to said second edge of such mating surface having a cross-section of a second configuration and being formed to at least partially hold a jacketed optical fiber therein, said cross-section of said second configuration being larger than said cross-section of said first configuration.

2. The housing as recited in claim 1 wherein
   each of said grooves in at least one of said members is uniformly formed from said first edge of such mating surface to said respective point, and is uniformly formed from said respective point to said second edge of such mating surface.

3. The housing as recited in claim 2 wherein each of said grooves changes from one uniform formation to a different uniform formation at said respective point.

4. A housing for supporting a plurality of optical fibers, each of said fibers being essentially jacketed with its jacket removed from one of its respective ends to a point spaced from said one end, said housing comprising
   a pair of matable members, each having a mating surface extending from a first edge to a second edge, which, when their mating surfaces are mated together with said optical fibers, form said housing,
   at least one of said members having a like plurality of first grooves extending from said first edge to a reference locus along its mating surface, and having a like plurality of second grooves extending from said reference locus to said second edge along its mating surface,
   said reference locus lying between said first edge and said second edge,
   said first grooves being adapted to support, at least partially, unjacketed optical fiber portions,
   said second grooves being adapted to support, at least partially, jacketed optical fibers portions.

5. The housing as recited in claim 4 wherein
   said mating surfaces are predominately planar; and wherein said points of said fibers are oriented along said reference locus.

6. The housing as recited in claim 5, together with said plurality of optical fibers wherein jacketed fibers extend from said second edge, and wherein unjacketed fibers extend from said first edge.

7. The housing as recited in claim 6, together with said plurality of optical fibers, wherein said first edge is planar, and wherein said unjacketed fibers extend therefrom to a common plane parallel to said first edge.

* * * * *

UNITED STATES PATENT AND TRADEMARK OFFICE
CERTIFICATE OF CORRECTION

PATENT NO. : 4,265,514

DATED : May 5, 1981

INVENTOR(S) : Charles K. Wellington, et al

It is certified that error appears in the above—identified patent and that said Letters Patent is hereby corrected as shown below:

Cancel the Front Page and the five (5) sheets of drawings and substitute therefor, the attached Front Page and four (4) sheets of drawings.

Signed and Sealed this

Thirtieth Day of March 1982

[SEAL]

Attest:

Attesting Officer

GERALD J. MOSSINGHOFF

Commissioner of Patents and Trademarks

United States Patent [19]

Wellington et al.

[11] 4,265,514

[45] May 5, 1981

[54] GUIDE CAPSULE FOR OPTICAL FIBER CONNECTORS

[75] Inventors: Charles K. Wellington, Tyngsboro; Mark L. Dakss, Sudbury, both of Mass.; John E. Benasutti, Oil City, Pa.

[73] Assignees: GTE Laboratories, Waltham, Mass.; Sylvania Inc., Stamford, Conn.

[21] Appl. No.: 49,691

[22] Filed: Jun. 18, 1979

[51] Int. Cl.³ .................................................. G02B 5/14
[52] U.S. Cl. ............................. 350/96.21; 350/96.22
[58] Field of Search ........................... 350/96.22, 96.21

[56] References Cited

U.S. PATENT DOCUMENTS

| | | | |
|---|---|---|---|
| 3,798,099 | 3/1974 | Marcatili | 350/96.21 |
| 3,861,781 | 1/1975 | Hasegawa et al. | 350/96.21 |
| 4,043,026 | 8/1977 | Weidhaas et al. | |
| 4,043,854 | 8/1977 | LeNoane et al. | |
| 4,046,453 | 9/1977 | Fiebelkorn et al. | |
| 4,046,454 | 9/1977 | Pugh | |
| 4,049,414 | 9/1977 | Smith | |
| 4,102,561 | 7/1978 | Hawk et al. | 350/96.21 |
| 4,123,137 | 10/1978 | Marcatili | 350/96.22 |

OTHER PUBLICATIONS

Optical Waveguide Cable Connection by Thiel & Hawk, Applied Optics vol. 15, No. 11, Nov. 1976, pp. 2785-2791.
"A Fiber Optic Cable Connector" by C. M. Miller, The Bell System Technical Journal, vol. 51, No. 9, Nov. 1975, pp. 1547-1555.
"A Molded-Plastic-Cables" by Smith et al., The Bell System Tech. Journal vol. 54, No. 6, Aug. 1975, pp. 971-984.
An Injection-Cable by Cherin et al., The Bell System Tech. Journal vol. 55, No. 8, Oct. 1976, pp. 1057-1067.
"Multipole Optical Fibre Connector" by Guttman et al., Electronics Letters, Nov. 27/75, vol. 11, No. 24, pp. 582-583.
"Eccentric Coupler for Optical Fibers-" by Zemon et al., Applied Optics vol. 14, Apr. 1975, pp. 815, 816.
"Plug In-Coupler" by M. L. Dakss et al., Electronic Letters, Jul. 11/74, vol. 10, No. 14, pp. 280, 281.
"Preperation of-Splices" by Chinnock et al., Bell System Tech. Journal vol. 54, Mar. 1975, pp. 471-477.
"Optical Fibre Connector" by Dalgleish et al., Electronic Letter, Jan. 9, 1975, vol. 11, No. 1, pp. 24-26.
"Optical Communication" Marketing Dept., Bell-Northers Research-BNR C-10 product.
Connecting the Thread of Light" by K. J. Fenton et al., Proc. Electrical Connector Symposium Cherry Hill, NJ., 1976, pp. 64-72.
Electrical Communicator, vol. 51, No. 2, 1976, pp. 85-90.
"Preparation of Optical Fiber End-" by Chinnock et al., Bell System Tech. Journal, Mar. 1975, vol. 54, No. 3, pp. 471-476.

Primary Examiner—Harold A. Dixon
Attorney, Agent, or Firm—Fred Fisher

[57] ABSTRACT

Each of a pair of members has a mating surface extending from one edge to another. When they are mated together, with optical fibers, they act as a housing. At least one member includes formed grooves on its mating surface, extending from one edge to another thereof. Each groove from one edge of the mating surface to a point medial to the one edge and the other edge is formed to at least partially hold an unjacketed optical fiber therein. Each groove from such point to the other edge is formed to at least partially hold a jacketed optical fiber therein. Each groove in at least one of the members can be uniformly formed from the one edge of the mating surface to the respective point, and can be uniformly formed from the respective point to the other edge of the mating surface. Each groove can change from one uniform formation to a different uniform formation at the respective point. The mating surfaces, preferably, are predominately planar, and the respective points of the fibers are oriented along a reference locus. Desirably, the housing, with the optical fibers, has jacketed fibers extending from one edge, and unjacketed fibers extending from the other edge. When the first edge is planar, the unjacketed fibers can extend therefrom to a common plane parallel to the first edge.

7 Claims, 20 Drawing Figures

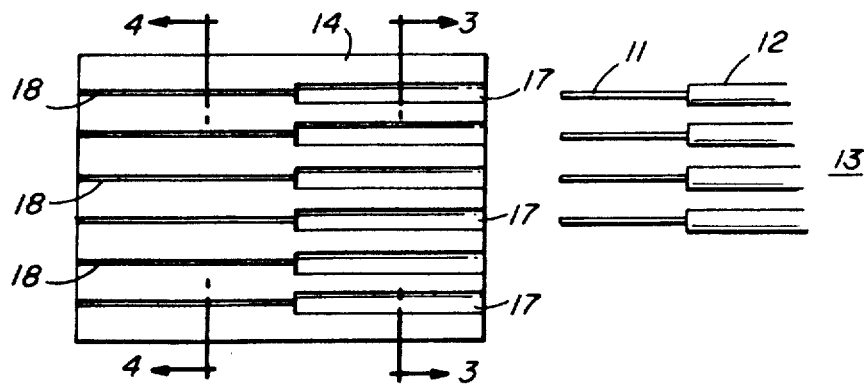

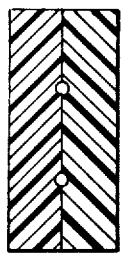
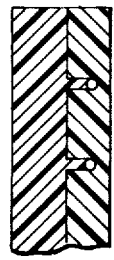
FIG. 6A    FIG. 6B
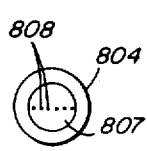
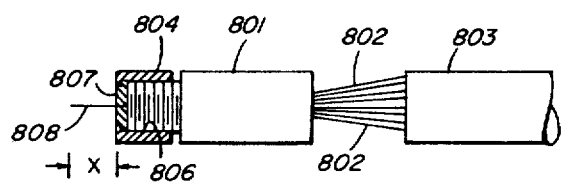
FIG. 8B    FIG. 8A
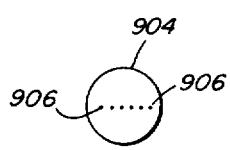
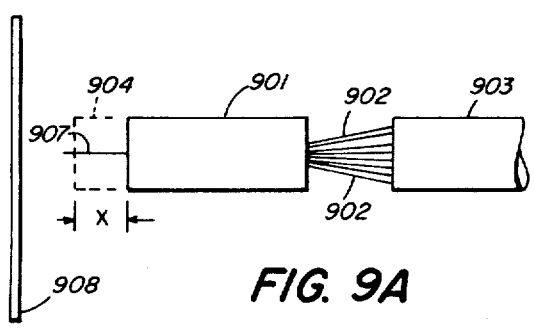
FIG. 9B    FIG. 9A